United States Patent
Cavallaro et al.

(10) Patent No.: US 6,412,328 B1
(45) Date of Patent: *Jul. 2, 2002

(54) METHOD AND APPARATUS FOR MEASURING THE SIZE OF DROPS OF A VISCOUS MATERIAL DISPENSED FROM A DISPENSING SYSTEM

(75) Inventors: William A. Cavallaro, Bradford, MA (US); Jeffrey P. Fugere, Sandown; Todd Edwin O'Neil, Plastow, both of NH (US); John Kaplan, Ithaca, NY (US); Stephen M. Franklin, Haverhill, MA (US)

(73) Assignee: Speedline Technologies, Inc., Franklin, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/496,721

(22) Filed: Feb. 2, 2000

Related U.S. Application Data

(63) Continuation of application No. 09/104,270, filed on Jun. 24, 1998, now Pat. No. 6,112,588, which is a continuation-in-part of application No. 08/738,093, filed on Oct. 25, 1996, now Pat. No. 5,837,892.

(51) Int. Cl.[7] ................................................. B67D 5/30
(52) U.S. Cl. ....................................................... 73/1.74
(58) Field of Search ...................... 73/1.74, 149, 53.01, 73/1.36; 222/55; 356/379, 384

(56) References Cited

U.S. PATENT DOCUMENTS

| | | | | |
|---|---|---|---|---|
| 4,331,262 A | * | 5/1982 | Snyder et al. | ................ 73/1.36 |
| 4,635,281 A | | 1/1987 | Jones | ........................... 377/21 |
| 4,967,933 A | | 11/1990 | Maiorca et al. | |
| 5,052,338 A | | 10/1991 | Maiorca et al. | |
| 5,110,615 A | | 5/1992 | Maiorca et al. | |
| 5,140,862 A | * | 8/1992 | Pappalardo | .................. 73/1.36 |
| 5,320,250 A | | 6/1994 | La et al. | |
| 5,465,879 A | | 11/1995 | La et al. | |
| 5,505,777 A | | 4/1996 | Ciardella et al. | |
| 5,837,892 A | * | 11/1998 | Cavallaro et al. | |
| 5,886,494 A | | 3/1999 | Prentice et al | ............... 318/625 |
| 5,906,682 A | | 5/1999 | Tooley et al. | ................ 210/660 |
| 5,929,314 A | * | 7/1999 | Bergkvist et al. | ............ 73/1.36 |

FOREIGN PATENT DOCUMENTS

| | | | | |
|---|---|---|---|---|
| JP | | 5-180683 | * | 7/1993 |

* cited by examiner

Primary Examiner—Robert R. Raevis
(74) Attorney, Agent, or Firm—Mintz, Levin, Cohn, Ferris, Glovsky and Popeo, P.C.

(57) ABSTRACT

A method and apparatus for measuring and controlling the size of drops of viscous material dispensed from a dispensing system. A dispensing apparatus in accordance with embodiments of the present invention includes a housing, a dispenser that dispenses a quantity of the viscous material, a measuring apparatus having a bottom plate to receive the viscous material, a top plate that is positioned over the bottom plate after the viscous material has been dispensed, and a compressing apparatus that compresses the material between the top and bottom plates. The dispensing apparatus further includes a viewing system that views the compressed material to determine the quantity of material dispensed by the dispenser. In one embodiment, the dispensing apparatus includes a controller that controls the quantity of viscous material dispensed based on the quantity of material determined by the viewing system.

13 Claims, 9 Drawing Sheets

METHOD AND APPARATUS FOR MEASURING THE SIZE OF DROPS OF A VISCOUS MATERIAL DISPENSED FROM A DISPENSING SYSTEM

RELATED APPLICATION

This application is a continuation application of U.S. patent application Ser. No. 09/104, 270, filed Jun. 24, 1998, now U.S. Pat. No. 6,112,588, which is a continuation-in-part of U.S. patent application Ser. No. 08/738,093, filed Oct. 25, 1996, now U.S. Pat. No. 5,837,892.

SUMMARY OF THE INVENTION

The present invention relates generally to a method and apparatus for measuring volume and/or weight of quantities of viscous materials, and more particularly, to a method and apparatus for measuring and controlling the size of drops of viscous material dispensed from a dispensing system.

DISCUSSION OF THE RELATED ART

There are several types of prior art dispensing machines used for dispensing metered amounts of liquid or paste for a variety of applications. One such application is in the assembly of surface mount printed circuit boards, wherein a large quantity of small dots of adhesive liquid are dispensed in precise, predetermined locations on a circuit board. The dots of adhesive liquid are used for connecting components to the circuit board. Another application of dispensing machines is in dispensing viscous material used for encapsulating integrated circuit chips and/or for under filling flip integrated circuit chips. The dispensing machines are generally required to run continuously to achieve a high throughput, and are also required to achieve a high degree of repeatability (i.e., be able to dispense substantially identical dots with a very small tolerance or variability between dots). The dispensing systems described above include those manufactured by Camelot Systems, Inc., the assignee of the present invention, and distributed under the name CAM/ALOT®.

In one prior art dispensing system, the weight of the dots dispensed by the system is periodically measured by a scale during calibration routines, and the dispensing system includes a feedback system to adjust the quantity of fluid dispensed by the dispensing system, so that the weight of the dots is controlled. There are several drawbacks associated with this prior art system, and these drawbacks are of particular concern in dispensing systems used for dispensing solder paste at precise locations on a circuit board, and in dispensing systems used for under filling flip chips. In these systems, the desired weight of the viscous drops is typically on the order of 0.002 grams. Scales utilized to accurately measure dots of this size are typically rather expensive, and the measured weight of a sample can vary greatly depending on temperature of the air, temperature of the sample, and due to vibration of the scale.

Another problem with the prior art system that measures weight is that for typical dispensing systems, it is more desirable to control the volume of material dispensed than to control the weight of the material dispensed. Although volume can be calculated based on weight when the specific gravity of the dispensing material is known, it has been found that the specific gravity of typical dispensing materials used for encapsulating integrated circuits tends to vary from its specified value after the material has been dispensed. If specific gravity is used to calculate volume based on weight, any variations in the specific gravity of the material dispensed will cause errors in the calculated volume.

A further problem associated with the prior art dispensing systems that use a scale to measure the weight of dispensed drops is that the materials dispensed by these systems are typically hazardous materials that require special precautions for disposal.

SUMMARY OF THE INVENTION

Embodiments of the present invention overcome the drawbacks of the prior art dispensing systems described above, and provide a method and apparatus for determining volume and/or weight of drops produced by a dispensing system during a calibration routine of the dispensing system. In embodiments of the present invention, a feedback control system, utilizing the method and apparatus for determining volume and/or weight, is incorporated into a dispensing system to ensure that consistent drops of a predetermined size are dispensed by the dispensing system.

In a first aspect of the present invention, a dispensing system for dispensing material onto a substrate includes a housing, a dispensing apparatus that dispenses a metered quantity of material, and a measuring apparatus. The measuring apparatus includes a bottom plate having a top surface to receive the material dispensed from the dispensing apparatus, a top plate positionable over the bottom plate after the material has been dispensed, and a compressing apparatus that compresses the material between the top and bottom plates. The dispensing system further includes a viewing system, coupled to the housing, that views the compressed material in the measuring apparatus to determine the quantity of material dispensed.

In an alternate version of the first aspect of the invention, the dispensing system further includes a control system that controls the quantity of material dispensed by the dispensing apparatus based on the quantity of material measured by the viewing system, thereby establishing a closed loop system that controls the quantity of material dispensed.

In a second aspect of the present invention, a dispensing system includes a housing, a dispensing apparatus that dispenses a quantity of material, and a measuring apparatus. The measuring apparatus includes a bottom plate having a top surface to receive the material dispensed from the dispensing apparatus, a top plate positionable over the bottom plate after the material has been dispensed, and a compressing apparatus that compresses the material between the top and bottom plates. The dispensing system further includes means for determining the quantity of material dispensed based on characteristics of the material compressed in the measuring apparatus.

In an alternate version of the second aspect, the dispensing system further includes means for controlling the quantity of material dispensed by the dispensing apparatus based on the quantity of material determined by the means for determining, thereby establishing a closed loop system that controls the quantity of material dispensed.

In a third aspect of the present invention, a measuring apparatus for determining a quantity of a viscous material includes a housing, a bottom plate having a top surface to receive the viscous material, a top plate positionable over the bottom plate after the viscous material has been received, a compressing apparatus that compresses the viscous material between the top and bottom plates, and a viewing system that views the compressed viscous material to determine the quantity of viscous material dispensed.

In an alternate version of the third aspect of the invention, the measuring apparatus further includes a gap shim disposed between the top plate and the bottom plate such that the compressed viscous material has a width equal to a width of the gap shim.

Another aspect of the present invention is directed to a method of measuring a quantity of material dispensed from a dispensing apparatus. The method includes steps of dispensing the material on to a bottom plate, disposing a top plate over the bottom plate, compressing the material between the top plate and the bottom plate, and viewing the compressed material through the top plate to determine the quantity of material dispensed.

In a preferred version of the method of measuring a quantity of material, the method further includes steps of comparing the quantity of material dispensed with a desired quantity to generate an error signal indicative of a difference between the desired quantity and the quantity dispensed, and controlling the quantity of material dispensed by the dispensing system based on the error signal.

In a fourth aspect of the present invention, a dispensing system includes a housing, a dispensing apparatus that dispenses a quantity of material and a measuring apparatus. The measuring apparatus includes a platform having a recessed area, a first slide that is placed in the recessed area to receive dispensing material from the dispensing head and a second slide that is disposed above the first slide to compress the dispensing material between the first slide and the second slide. The dispensing system also includes a vacuum head for loading the slides onto the platform and includes a viewing system that views the compressed material.

In one version of the fourth aspect of the invention, the dispensing system includes a controller programmed to determine a delay of the dispensing apparatus and programmed to determine a velocity of the dispensing apparatus with respect to a substrate based in part on the delay determined.

DESCRIPTION OF THE DRAWINGS

For a better understanding of the present invention, reference is made to the drawings which are incorporated herein by reference and in which.

DETAILED DESCRIPTION

For purposes of illustration only, and not to limit generality, the present invention will now be explained with reference to a dispensing system used to dispense an adhesive, solder paste, or some other media onto a substrate such as a circuit board or an integrated circuit chip. One skilled in the art will appreciate, however, that embodiments of the present invention are not limited to dispensing systems, but rather, the volumetric measuring apparatus in accordance with embodiments of the present invention may be used in other applications requiring precise, volume or weight measurements of small quantities of viscous materials.

Figure 1:
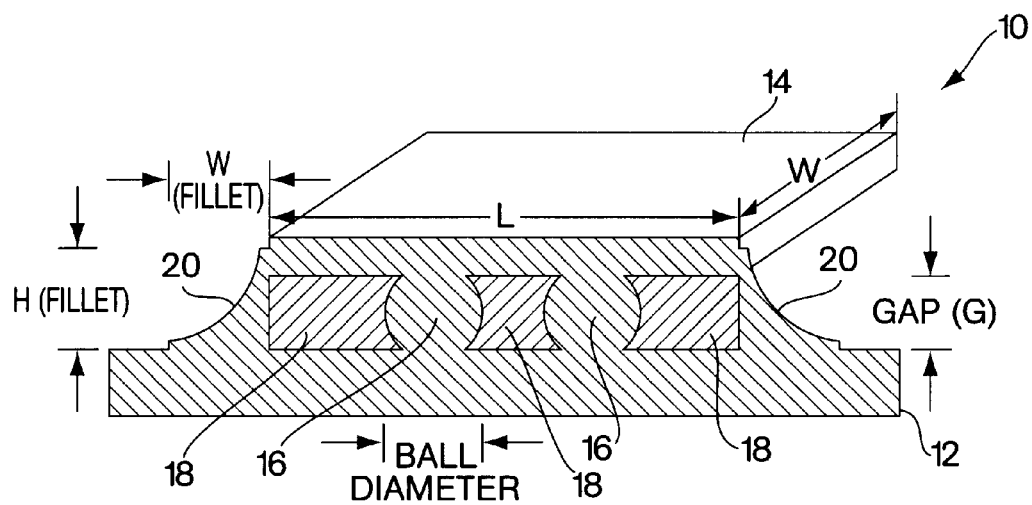
FIG. 1 is a cross-sectional view of a flip chip integrated circuit.

FIG. 1 shows a cross-sectional view of a flip chip integrated circuit 10 having a base 12 and a die 14. A number of solder balls 16 are disposed between the base and the die of the integrated circuit to provide electrical connections between the die and the base. Underfill material 18 is disposed in the gap between the die 14 and the base 12 around all of the balls 16, and a fillet of underfill material 20 is disposed on the base around the perimeter of the die 14. The total volume V of underfill material required to properly fill the gap and provide the fillet around the perimeter of the die can be determined using equation (1) below:

$$V = V_c - V_b + V_f \qquad \text{Equation 1}$$

where: $V_c$=the volume of the gap between the die and the base;

$V_b$=the total volume of all the solder balls; and $V_f$=the volume of the fillet.

In one typical application, $V_c$ is approximately equal to 22.58 mm$^3$, $V_b$ is approximately equal to 0.30 mm$^3$, and $V_f$ is approximately equal to 0.50 mm$^3$, so that the total volume V of underfill material is equal to approximately 22.78 mm$^3$. Dispensing systems are typically used to provide the underfill material for flip chip integrated circuits. For the typical application described above, to properly underfill the integrated circuit 10, it is desirable to dispense precisely 22.78 mm$^3$ of underfill material from a dispensing system.

Figure 2:
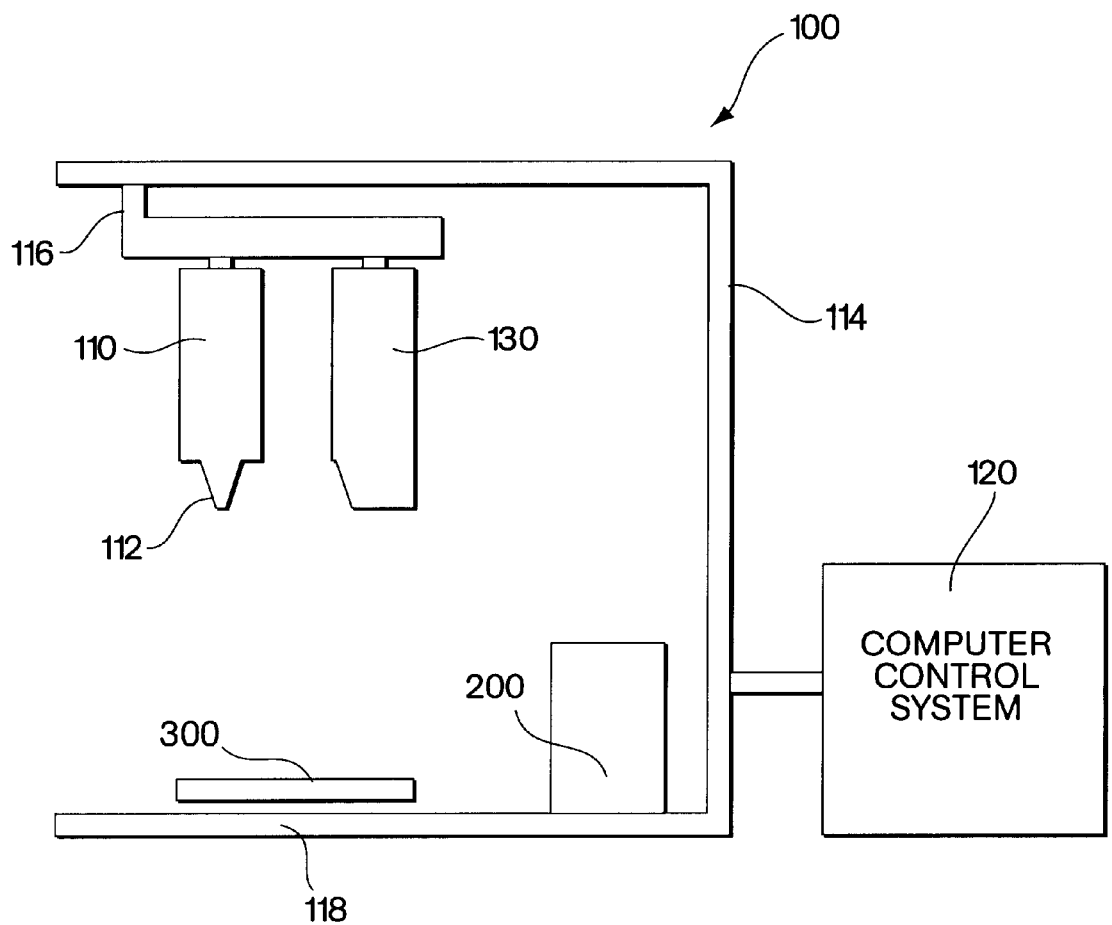
FIG. 2 is a drawing of a dispensing system in accordance with one embodiment of the present invention.

FIG. 2 shows a liquid dispensing system 100 in accordance with one embodiment of the present invention for dispensing materials including underfill material. The liquid dispensing system 100 includes a pump and dispenser assembly 110, a computer control system 120, a vision system 130, and a volumetric measuring apparatus 200. The liquid dispensing system 100 has a frame 114 having a lower base 118 for supporting a circuit board 300 or some other substrate that is to receive drops of material dispensed by the pump and dispenser assembly 110. The pump and dispenser assembly 110 and the vision system 130 are coupled to an arm 116 which in turn is movably coupled to the frame 114 of the dispensing system 100. The arm 116 can be moved, using motors (not shown), under the control of the computer control system, in X, Y and Z directions, to locate the pump and dispenser assembly 110 and the vision system 130 at predetermined locations and heights over the circuit board 300 and the volumetric measuring apparatus 200.

The dispensing system 100 operates as follows. The circuit board 300, or some other substrate that is to receive material dispensed from the dispensing system, is placed on the base 118 of the dispensing system. The circuit board 300 may be placed on the base manually, or in a preferred embodiment, a conveyor system is used for loading circuit boards or other substrates into the dispensing system 100. The base 118 may also include a vacuum lift table for securing the board 300 to the base 118 during the dispensing operation, and may also include a heater to maintain the circuit board and dispensed material at a desired temperature.

The pump and dispenser assembly 110 dispenses drops of material through a nozzle 112 at predetermined points on the circuit board 300. The material is stored in a container (not shown), coupled to the pump and dispenser assembly, at a constant pressure and temperature. In a preferred embodiment, the pump and dispenser assembly includes a rotary type pump having an auger within an auger chamber. The auger is precisely turned within the auger chamber to dispense metered quantities of liquid. The volume of material dispensed for a given rotary type pump is controlled by setting the revolutions per minute (RPM) of the auger and the dispensing time of the pump. The auger and auger chamber are described in patent application Ser. No. 08/562,068 entitled "Liquid Dispensing System With Improved Sealing Augering Screw and Method For Dispensing", assigned to the assignee of the present invention, and incorporated herein by reference.

The computer control system 120 controls motors (not shown) to move the arm 116 in the X, Y, and Z directions to properly position nozzle 112 of the pump and dispenser assembly 110 over the circuit board to ensure that dispensing occurs at the predetermined points on the circuit board. The computer control system is pre-programmed with a desired material dispense pattern for the circuit board and may contain programs for depositing drops on several different types of circuit boards or other substrates.

The vision system 130 is used for providing proper alignment of the pump and dispenser 110 with the circuit board 300 prior to the dispensing of drops onto the circuit board. The vision system 130 locates fiducial points or other recognizable patterns on the circuit board in order to properly align the pump and dispenser assembly with the circuit board. The vision system is also used after dispensing has occurred to inspect the material that has been deposited onto the circuit board (or some other substrate) to ensure that the proper amount of material has been deposited, and to ensure that the material has been deposited at the proper locations on the circuit board. As described below in further detail, the vision system is also used in conjunction with the volumetric measuring apparatus to determine the volume of drops dispensed from the dispensing system during a calibration routine.

In one embodiment, the vision system is implemented using a CCD camera part #XC73 available from Sony and a Cognex® 5200 Vision Processor and Video Mixer Card manufactured by Cognex, Inc., Norwood, Mass.

Figure 3:
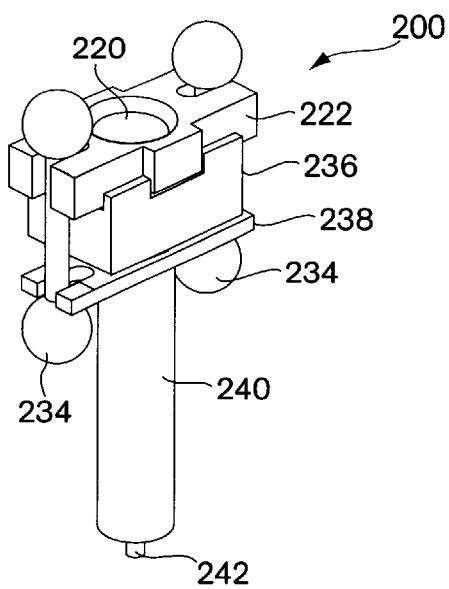
FIG. 3 is a perspective view of an apparatus used to measure volumetric output in the dispensing system of FIG. 2.
Figure 4:
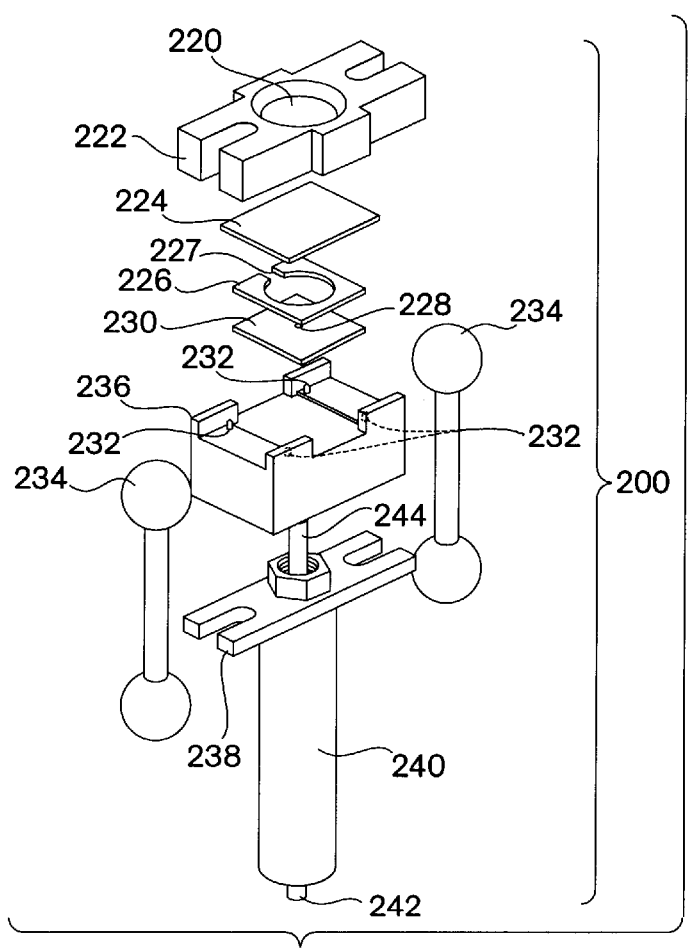
FIG. 4 is an exploded perspective view of the apparatus for measuring volumetric output of FIG. 3.

The volumetric measuring apparatus 200 is shown in greater detail in FIGS. 3 and 4. The volumetric measuring apparatus has a bottom plate 230 on which a drop of material 228 is deposited from the pump and dispenser assembly 110 during a calibration routine of the dispensing system 100. In one embodiment, the bottom plate 230 is a clear glass slide. The bottom plate is supported by four slide supports 232 located on a lower bracket 236. The lower bracket 236 is disposed over a pressure yoke 238 which is coupled to a frictionless cylinder 240 having an air inlet 242 for coupling to a pressurized air supply (not shown). The frictionless cylinder has a movable piston 244 coupled to the lower bracket 236.

After a drop has been deposited on the bottom plate 230, a gap shim 226 is placed on the bottom plate, and a top plate 224 is placed on top of the gap shim. The top plate is made from glass or some other transparent material so that the drop can be seen through, the top plate. A pressure plate 222 is then placed upon the top plate and coupled to the pressure yoke 238 using two dumbbell shaped force rods 234. The pressure plate 222 has a circular viewing hole 220 for viewing the sample drop 228 through the pressure plate 222.

The volumetric measuring apparatus 200 operates within the dispensing system 100 as follows. During a calibration routine of the dispensing system, the computer control system controls the arm 116 to position the pump and dispenser assembly 110 above the bottom plate 230. Initially, the top plate 224 and the pressure plate 222 are removed from above the bottom plate 230, so that a target drop may be deposited on the upper surface of the bottom plate. The removal of the pressure plate 222 and the top plate 224 may be done manually or may be accomplished automatically by the dispenser system 100 under the control of the computer control system 120.

After the target drop has been deposited on the bottom plate 230, the top plate 224 and the pressure plate 222 are placed on the gap shim 228 and secured to the volumetric measuring apparatus using the force rods 234. The placement of the top pressure glass slide 224 and the pressure plate 222 may be accomplished manually or automatically by the dispenser system 100 under the control of the computer control system 120.

Once the pressure plate 222 has been secured to the pressure yoke 238 using the force rods 234, air pressure is provided to the air inlet 242 of the frictionless cylinder 242 to extend the piston 244 of the cylinder 240 to provide a predetermined pressure to the target drop so that the target drop is compressed between the bottom plate 230 and the top plate 224. The predetermined pressure applied by the piston is determined based on characteristics of the material being dispensed by the dispensing system. The predetermined pressure is sufficient to fully compress the target drop such that the top plate and the bottom plate are in continuous contact with the gap shim, so that the width of the target drop in the fixture is substantially equal to the width of the gap shim 226.

The width of the gap shim 226 is chosen based on the desired size of the target drop 228, such that the target drop becomes substantially cylindrical in shape when the volumetric measuring apparatus is in its fully compressed position with both the top and bottom plates in complete contact with the gap shim. The width of the gap shim should be greater than the size of any solid particles in the material being dispensed, so that both the top and bottom plates can come in contact with the gap shim; however, if the width of the gap shim is too large, the drop will not be sufficiently compressed to become cylindrical in shape. As shown in FIG. 4, the gap shim has a slot 227 to allow air to escape from between the top and bottom plates as the target drop is compressed. In one embodiment of the volumetric measuring apparatus, the gap shim has air slots equally positioned around the perimeter of gap shim to ensure that the air exiting the area between the plates is evenly distributed around the perimeter of the gap shim.

The computer control system 120 controls the motors on the arm 116 to position the vision system 130 over the viewing hole 220 of the volumetric measuring apparatus after the target drop has been compressed between the top and bottom plates. The vision system 130 views the target drop through the viewing port 220 and determines the surface area of the target drop and provides this information to the computer control system. The viewing system includes a lighting system (not shown) that provides light through the viewing hole on to the target sample to allow the viewing apparatus to view the target drop. Using the surface area of the target drop, and the known width of the gap shim 226, the volume of the target drop may be calculated by the computer control system 120.

Figure 5:
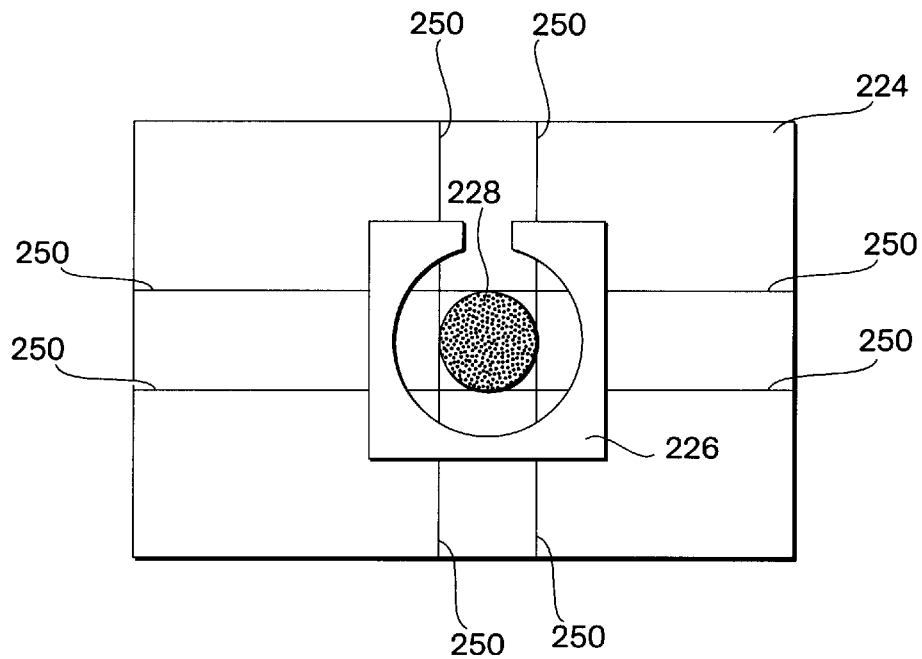
FIG. 5 shows a drop of material dispensed from a dispensing system in the apparatus for measuring volumetric output of FIGS. 3 and 4.

FIG. 5 shows a target drop 228 compressed between the top plate 224 and the bottom plate 230 as viewed through the viewing port 220. As shown in FIG. 5, the bottom plate and/or the top plate may have a number of opaque lines 250 detectable by the vision system to enable the vision system to provide a more precise determination of the surface area of the target drop. In one embodiment of the present invention, the opaque lines are positioned based on the desired size of the drop and based on the allowable tolerance in the size. In this embodiment, because the width of the compressed target drop is equal to the width of the gap shim 226, the viewing system can determine whether the size of the target drop is within acceptable tolerances by comparing the position of the edges of the target drop with the position of the opaque lines, without directly calculating surface area, volume or weight of the target drop.

Based on inputs from the vision control system and based on the desired size of the drops (which information is previously stored in the computer control system), the computer control system generates an error value equal to the difference between the desired volume of the drops and the measured volume of the target drop. Based on the error value, the computer control system controls the pump and dispenser apparatus 110 to increase or decrease the volume of the drops dispensed. For the embodiment of the dispenser system that utilizes a rotary type auger pump, the volume is adjusted by adjusting the RPM setting of the rotary type auger pump. Alternatively, the volume could be adjusted by adjusting the dispensing time.

In the manner described above, the dispenser system 100 utilizes a closed loop calibration routine to periodically calibrate the size of the drops being dispensed by the pump and dispenser apparatus 110. The volumetric measuring system of the dispensing system 100 overcomes the drawbacks of the prior art systems that utilize a scale to measure the weight of dispensed drops, as the volumetric measuring apparatus is relatively insensitive to changes in ambient temperature and to vibration of the apparatus. Further, since the viewing system used in conjunction with the volumetric measuring apparatus is typically available on prior art dispensers, it is relatively inexpensive to incorporate the volumetric measuring apparatus within prior art dispensers.

In one embodiment of the present invention, the top plate 224 and the bottom plate 230 are implemented using Mylar tape or some other transparent material. The Mylar tape for the top plate and the bottom plate are supplied from separate supply rolls of tape. After a calibration routine, each of the rolls of tape is advanced sufficiently to place new sections of tape in the apparatus and to remove the old sections of tape containing the previous target drop. The use of rolls of material for the top and bottom plate allows the dispensing system to automatically perform calibration routines, as the top and bottom plates containing the target samples do not have to be manually removed after each calibration routine. The old sections of tape are collected on disposal rolls of tape so that the target drops used in the calibration procedure can be easily collected for proper disposal.

In another embodiment, only one roll of tape is used to supply tape for both the top and bottom plates. Prior to being placed in the volumetric measuring apparatus, the tape is folded into top and bottom plates or appropriately cut into top and bottom plates. Further, the gap shim may be incorporated into the tape to simplify the apparatus.

In another embodiment of the present invention, the lighting system incorporated within the vision system 130 is not used to illuminate the target drop. Rather, a back lighting system is incorporated into the lower bracket 236 such that light is provided from beneath the target drop through the bottom plate 230.

The back lighting system may be implemented using fiber optic probes or other lighting devices incorporated into the lower bracket 236. By providing back lighting, the ability to detect the edges of the target drop 238 is further enhanced.

Figure 6:
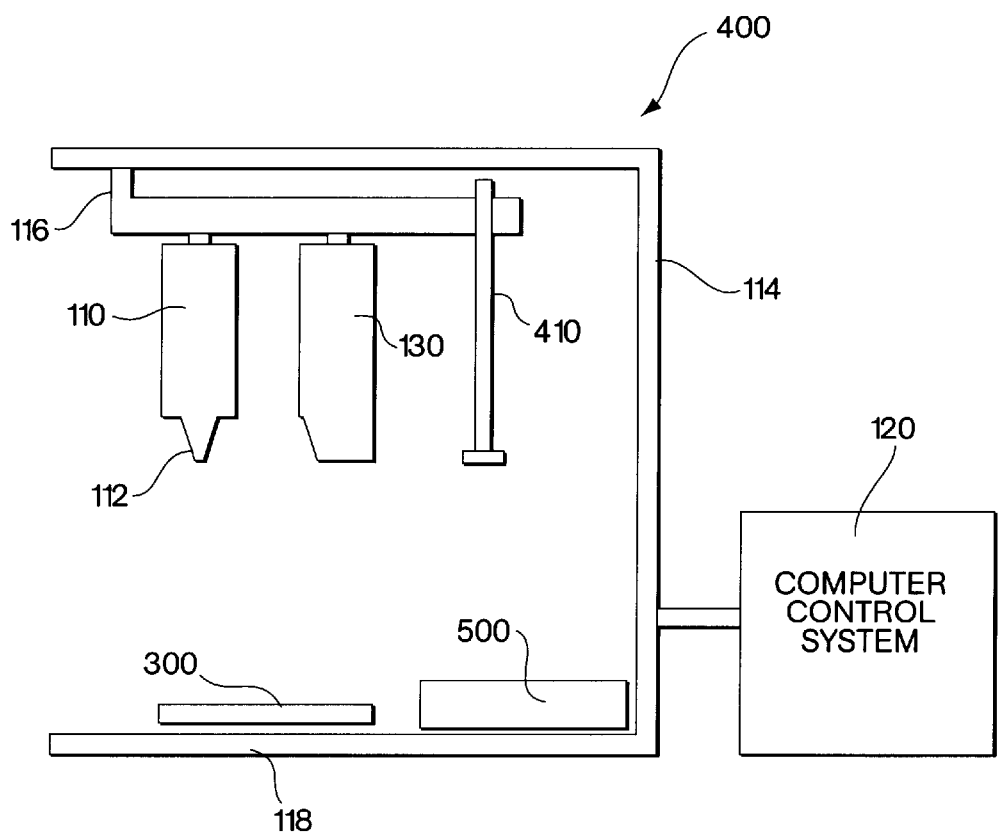
FIG. 6 is a drawing of a dispensing system in accordance with a second embodiment of the present invention.

A second embodiment of a dispensing system 400 having a volumetric measurement/calibration system is shown in FIG. 6. The dispensing system 400 is similar to the dispensing system 100 shown in FIG. 2, and like elements are labeled with the same reference numbers. The arm 116 of the dispensing system 400 supports a pump and dispenser assembly 110 and a vision system 130, as in the dispensing system 100, and in addition, the arm 116 of the dispensing system 400 also supports a vacuum pick-up assembly 410. The dispensing system 400 also includes a volumetric measurement apparatus 500.

Figure 7:
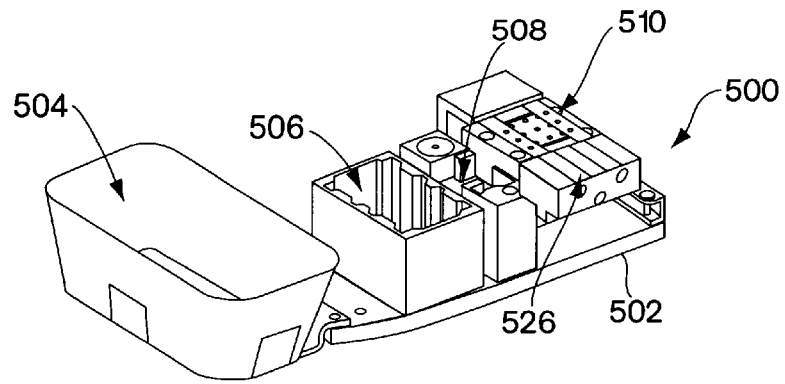
FIG. 7 is a perspective side view of a volumetric measuring apparatus of the dispensing system shown in FIG. 6.

The volumetric measurement apparatus 500 of the dispensing system 400 is shown in greater detail in FIG. 7, which shows a perspective view of the volumetric measurement apparatus. The volumetric measurement apparatus includes a base assembly 502, a waste station 504, a glass stack holder 506, a mylar holder 508, and a chuck assembly 510. The waste station, the glass stack holder, the mylar holder, and the chuck assembly are disposed upon the base assembly. The volumetric measurement apparatus is used to measure volume of dispensed drops from the pump and dispenser assembly in the dispensing system 400.

The waste station 504 is used to contain used mylar and glass slides that contain material dispensed from the dispensing system during a calibration routine. In one embodiment, the waste station is made from aluminum foil and is easily removable from the base assembly to allow the waste station to be placed in an oven to cure the dispensed material. The entire waste station can then be properly disposed, and a new waste station can be put in its place on the base assembly.

The glass stack holder 506 is positioned on the base assembly next to the waste station, and the mylar holder 508 is positioned next to the glass stack holder. The glass stack holder is designed to hold two stacks of glass slides, and the mylar holder is designed to hold one stack of mylar slides, which are considerably thinner than the glass slides. In one embodiment, glass slides having part number 30599, available from Speedline, Inc. of Haverhill, Mass. and mylar slides having part number 29764 available from Speedline, Inc. of Haverhill, Mass. are used in the volumetric measurement apparatus.

Figure 8:
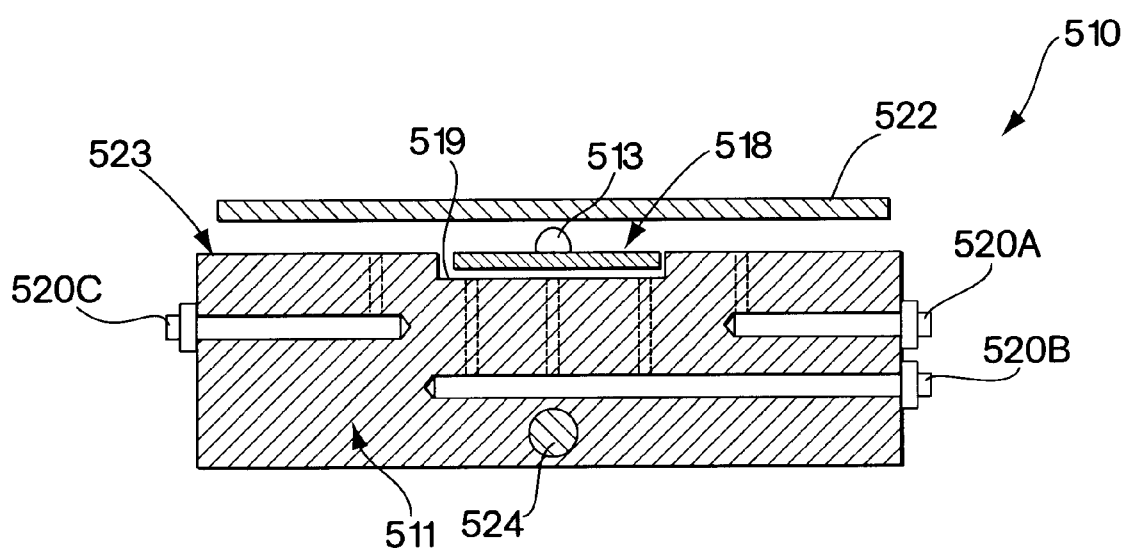
FIG. 8 is a side view of a chuck assembly of the dispensing system shown in FIG. 6.

A cross-sectional side view of the chuck assembly 510 is shown in FIG. 8. The chuck assembly includes three vacuum ports 520A, 520B and 520C coupled to channels formed in the base 511 of the chuck assembly. In the dispensing system 400, each of the vacuum ports is coupled to vacuum pumps that are controlled by the computer control system 120. The vacuum ports and channels are used to secure a mylar slide 518 to a lower platform 519 and to secure a glass slide 522 to an upper platform 523 of the chuck assembly during a calibration routine of the dispensing system 400. Vacuum pumps coupled to vacuum ports 520B and 520C are used to secure the glass slide to the chuck assembly, while a vacuum pump coupled to vacuum port 520A is used to secure the mylar slide to the chuck assembly.

The chuck assembly 510 includes a rod type heater 524 contained within the base to heat the chuck assembly, mylar slide, glass slide and the dispensed material 513 during a calibration procedure. In one embodiment, a cartridge heater is used to heat the chuck assembly to a temperature of approximately 80° C., however, this temperature may be adjusted based on characteristics of the material being dispensed. As shown in FIG. 7, the chuck assembly includes a pre-heat platform 526 located on an upper surface of the chuck assembly adjacent to the upper platform 523. The pre-heat platform is also heated by the rod heater 524, and is used to pre-heat glass slides prior to their use in a calibration procedure. The chuck assembly also includes a vacuum sensor coupled to the computer control system that detects whether a mylar slide is properly disposed on the lower platform 519.

The depth of the lower platform of the chuck assembly with respect to the upper platform is selected based on the desired dispensing volume, the viscosity of the volume being dispensed and the field of view of the camera. In one embodiment, the dispensing system has two chuck assemblies, one having a depth of 0.014 inches and one having a depth of 0.024 inches. For materials with a high viscosity, or for low volumes of material, it is preferred to use the chuck assembly with the smaller depth. For the typical application described above, in which 22.78 mm$^3$ of underfill material is to be dispensed, it is preferred to use the chuck assembly with a depth of 0.014 inches.

Figure 9:
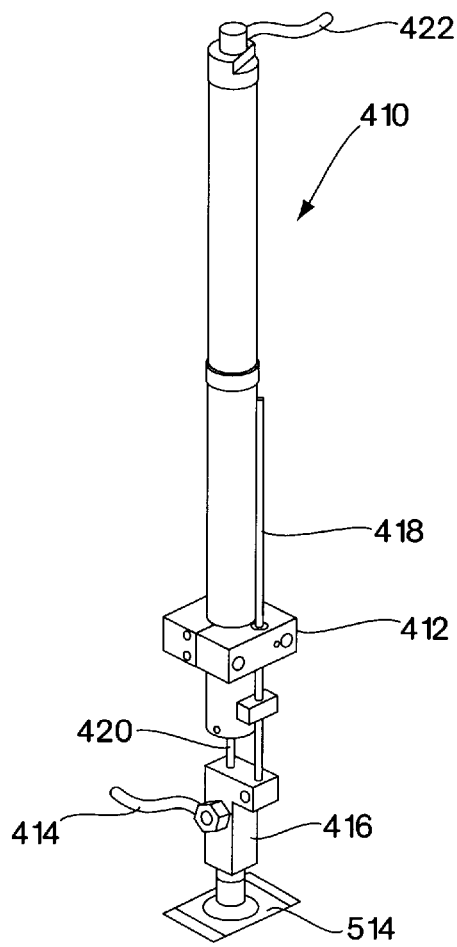
FIG. 9 is a perspective side view of a vacuum pick-up assembly used in the dispensing system shown in FIG. 6.

The vacuum pick-up assembly 410 used in the dispensing system 400 is shown in greater detail in FIG. 9. As discussed below, the vacuum pick-up assembly is used to place a glass slide and a mylar slide on the chuck assembly during a calibration procedure of the dispensing system. The vacuum pick-up assembly has a bracket 412 for coupling the pick-up assembly to the arm 116 of the dispensing system 400. The pick-up assembly also includes a vacuum nozzle 416 coupled to a vacuum hose 414. The vacuum hose is coupled in the dispensing system to a vacuum generator (not shown) that under the control of the computer control system provides negative air pressure to the vacuum nozzle to allow the vacuum nozzle to pick up the mylar slides and the glass slides. In FIG. 9, the vacuum nozzle is shown after having picked up a mylar slide 514.

The vacuum pick-up assembly further includes an air cylinder 418 having a retractable piston 420 coupled to the vacuum nozzle 416. The air cylinder 418 is coupled to an air line 422. The air line 422 is coupled to a pressurized air source (not shown) in the dispensing system. The pressurized air source is controlled by the computer control system to control the pressure of air provided to air cylinder 418 to cause the piston to extend from and retract into the air cylinder. In one embodiment, the vacuum pick-up assembly also includes a retraction sensor that detects if the piston is in the retracted position. In this embodiment, the computer control system prevents horizontal movement of the vacuum pick-up assembly unless the piston is in the retracted position.

In one embodiment, a vacuum sensor is mounted on the vacuum nozzle. The sensor is coupled to the computer control system and is used to detect whether the vacuum nozzle has properly picked up a mylar slide, a glass slide or a combination of a mylar slide, a glass slide and dispensed material.

Figure 10:
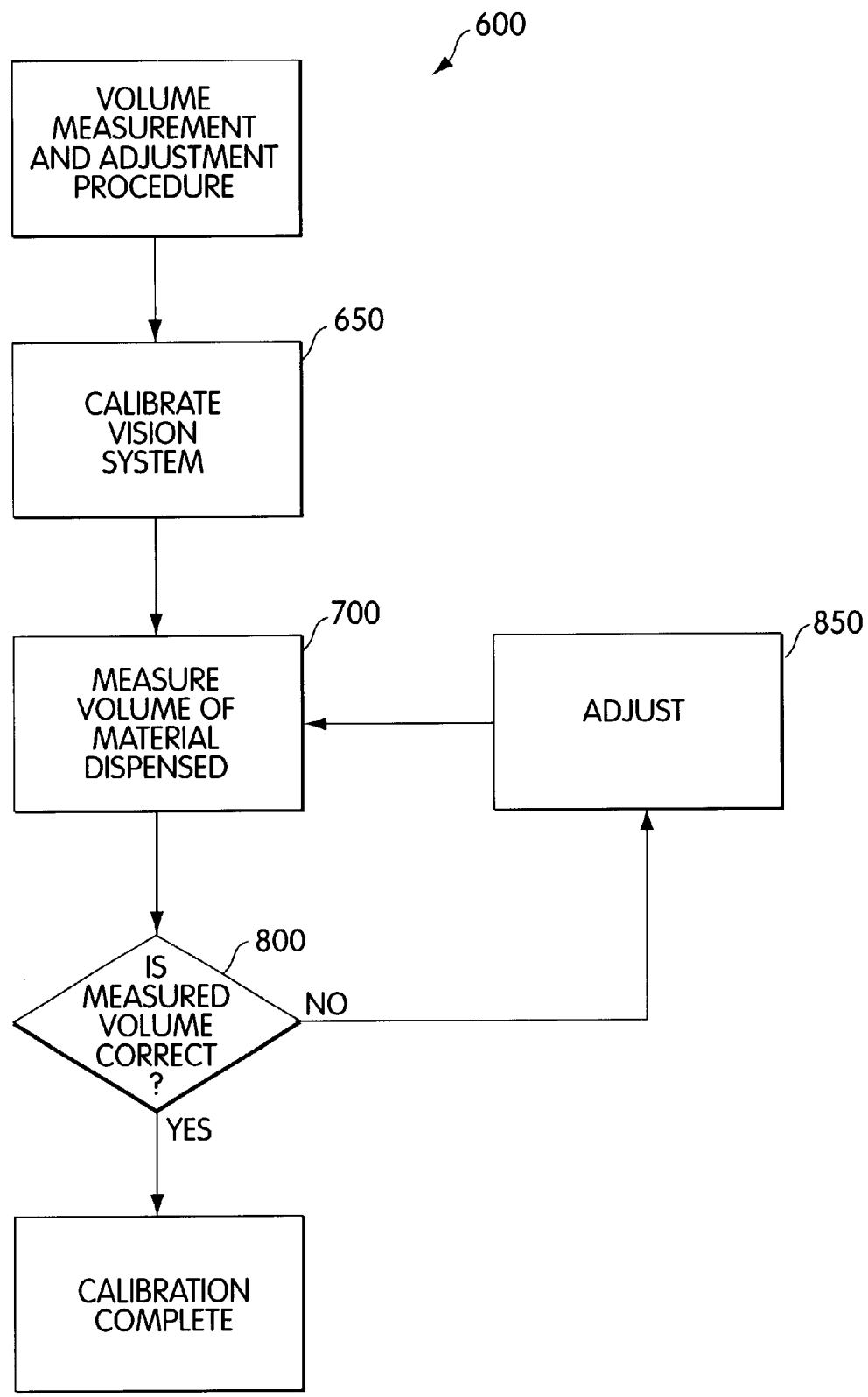
FIG. 10 is a flow chart of a volumetric measurement and adjustment procedure used in the dispensing system of FIG. 6.
Figure 11A:
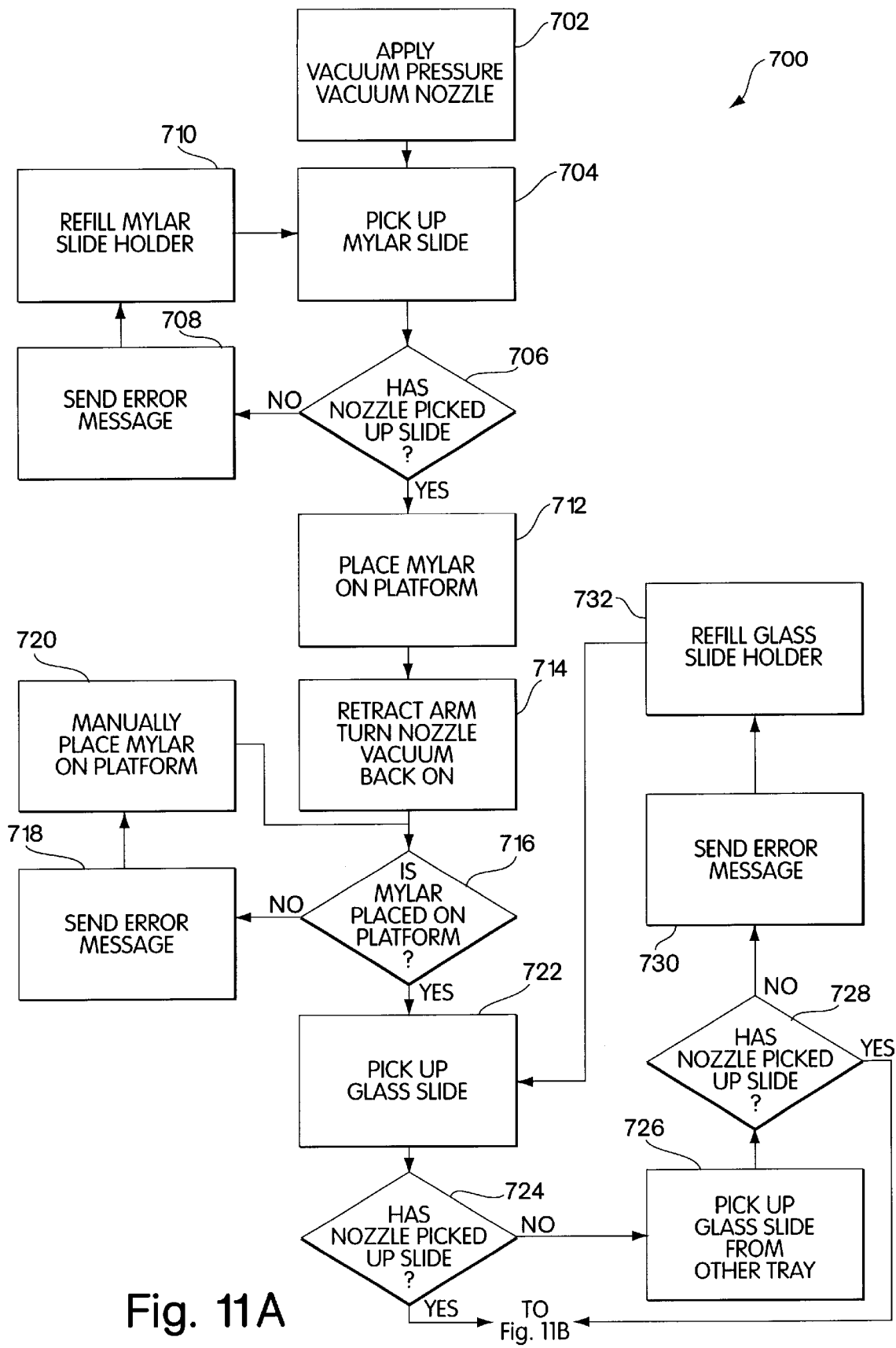
FIGS. 11a and 11b are a flow chart of a volumetric measurement procedure used in the procedure of FIG. 10.
Figure 11B:
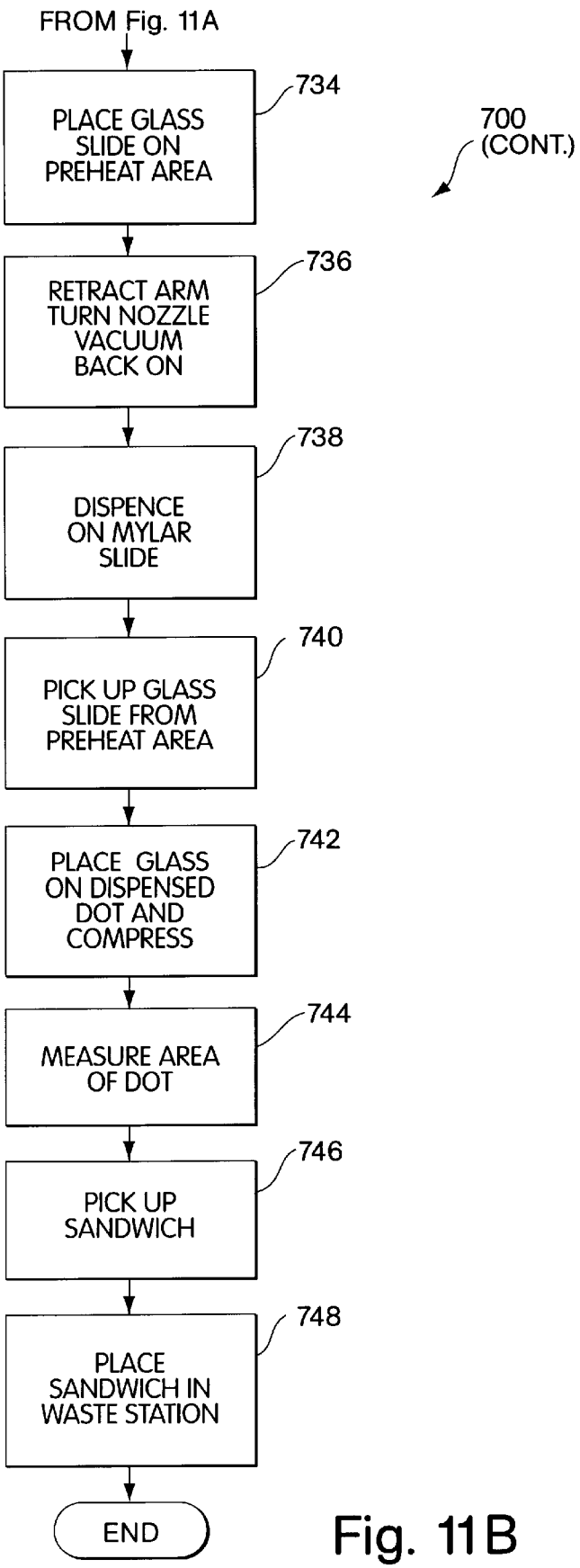

The operation of the dispensing system 400 during a calibration cycle in which the volume of a target drop of material dispensed from the dispensing system is determined will now be described with reference to FIG. 10. FIG. 10 shows a flow chart of a volumetric measurement and adjustment procedure 600. In an initial step 650 of the procedure 600, a camera calibration is performed. The purpose of the camera calibration is to determine the area that each pixel of the camera represents at the measurement height to be used during the volumetric measurement procedure. The camera calibration procedure is conducted using known vision calibration tools such as those available from Cognex of Norwood, Mass. The camera calibration procedure is conducted using a known image, such as a fiducial mark on a circuit board Once the camera calibration step is completed, then in step 700, the actual volume of material dispensed from the pump is determined. The procedure by which the volume of material dispensed is determined in step 700 will now be described with reference to FIGS. 11a and 11b. In step 702, vacuum pressure is provided to the vacuum nozzle 416. Then in step 704 the pick-up assembly 410 is disposed over the stack of mylar slides in the mylar holder 508 and the piston 420 is extended from the air cylinder 418 of the pick-up arm assembly to allow the vacuum nozzle to pick up a mylar slide. In decision block 706, the sensor on the vacuum nozzle is used to determine whether the vacuum nozzle has properly picked up a mylar slide. If the outcome of decision block 706 is NO, then in steps 708 and 710, the operator is instructed to refill the mylar holder, and the procedure then returns to step 704.

If the outcome of decision block 706 is YES, then in step 712, the pick-up arm assembly moves over the chuck assembly, and the vacuum pressure to the vacuum nozzle is turned off to place the mylar slide on the lower platform 519. When the mylar slide is placed on the lower platform, vacuum pressure is provided to vacuum port 520A to securely hold the mylar slide on the platform. The piston is then retracted into the air cylinder and the vacuum pressure is turned back on in step 714. In decision block 716, the sensor on the lower platform is used to determine whether the mylar slide has been properly placed on the lower platform. If the outcome of decision blocks 716 is NO, then an error message is generated in step 718, the error is corrected in step 720, and the procedure returns back to decision block 716.

If the outcome of decision block 716 is YES, then in step 722, the vacuum nozzle is positioned over the location for the first stack of glass slides in glass stack holder 506 to pick up a glass slide from the first stack. The sensor on the vacuum nozzle is then used in decision block 724 to determine whether a glass slide has been picked up by the vacuum nozzle. If the outcome of step 724 is no, then in step 726, the vacuum nozzle is positioned over the location for the second stack of glass slides to pick up a glass slide from the second stack. The sensor on the vacuum nozzle is then used again in decision block 728 to determine whether a glass slide has been picked up by the vacuum nozzle. If the outcome of decision block 728 is NO, then in steps 730 and 732 an error message is generated, the glass holder is filled with glass slides, and the process returns to step 722.

If the outcome of either decision block 724 or decision block 728 is YES, then the vacuum nozzle is positioned over the preheat area of the chuck assembly, and the vacuum pressure to the vacuum nozzle is turned off to place the glass slide (step 734) on the preheat area. The glass slide is preheated to approximately the same temperature as the mylar slide and the material dispensed from the dispenser. The piston is then retracted into the air cylinder and the vacuum pressure is turned back on in step 736.

A target drop of material is dispensed onto the mylar slide disposed on the lower platform using the pump and dispenser assembly in step 738. The glass slide on the preheat area of the chuck assembly is then picked up by the vacuum nozzle in step 740 and placed on the upper platform of the chuck assembly in step 742. The sensor on the vacuum arm may be used between steps 740 and 742 to determine whether the vacuum nozzle has properly picked up the glass slide. When the glass slide is placed on the upper platform, vacuum pressure is provided to vacuum ports 520B and 520C causing the glass slide to squish the dispensed material between the glass slide and the mylar slide. The preheating of the glass slide allows the dispensed material to easily flow across the surface of the glass slide while the material is being compressed.

The camera is then positioned above the dispensed material on the mylar slide, and the surface area of the target drop is determined in step 744. The vacuum nozzle is used in step 746 to pick up the sandwich consisting of the mylar slide, the compressed target drop and the glass slide from the chuck assembly. The sensors on the chuck assembly may be used to determine whether the complete sandwich has been picked up by the vacuum nozzle. In step 748, the sandwich is placed in the waste station 504. In one embodiment of the present invention, when the sandwich is picked up from the chuck assembly, positive air pressure is provided to vacuum port 520A to ensure that the mylar slide is lifted off of the chuck assembly as part of the sandwich.

The computer control system determines the volume of the target drop using the surface area determined for the target drop and the thickness of the target drop. The thickness of the target drop is equal to the depth of the lower platform in the chuck assembly minus the thickness of the mylar slide, both of which are known values. Once the volume is determined, step 700 of the procedure 600 (FIG. 10) is completed.

The procedure 600 then continues with decision block 800 where the volume of the target drop is compared with the desired volume of drops to be dispensed by the dispensing system. If the difference between the volume determined and the desired volume is within predetermined tolerances, then the process 600 ends, and dispensing from the dispensing system onto substrates can begin. If the difference between the volume determined and the desired volume is not within predetermined tolerances, then process 600 continues with step 850 wherein adjustments are made to settings of the pump and dispenser assembly to reduce the difference between desired volume and dispensed volume.

As discussed above, in one embodiment of the present invention the pump and dispenser assembly includes a rotary type auger pump. In this embodiment; when it is necessary to adjust the pump in step 850 of procedure 600, the RPM setting of the rotary type pump is adjusted based on the difference between the measured volume and the desired volume. The new RPM setting for the pump is determined using Equation (2) below:

$$\text{NewRPM} = (\text{OldRPM} + \text{PUMPBIAS})/(\text{Actual}/\text{Goal}) - \text{PUMPBIAS} \quad \text{Equation (2)}$$

Where:

NewRPM equals the RPM for the desired volume of material;

OldRPM equals the RPM used during the previous volume measurement;

Actual equals the volume of material measured in the previous measurement;

Goal equals the desired volume of material to be dispensed; and

PUMPBIAS is a constant.

The constant PUMPBIAS provides correction for non-linearity between the RPM value for a pump and the volume dispensed from the pump for small volumes of material. The value of PUMPBIAS may vary depending on the type of material being dispensed and depending on the particular type of pump used. In one embodiment of the present invention, for which a Model 685 rotary positive displacement pump available from Camelot Systems, Inc, Haverhill, Mass. has been used to dispense several types of underfill material, it has been found that the constant PUMBIAS should have the value 70. For any particular pump or dispensing material, the proper value for PUMPBIAS may be determined empirically by measuring the volume of several target drops using a same dispensing time but different RPM values, and using the measured volumes and corresponding RPM values to solve for PUMPBIAS using Equation (2).

Steps 700, 800 and 850 of the procedure 600 are repeated until the outcome of step 800 is YES or until the system times out after a predetermined number of cycles, which in one embodiment is four cycles. Alternatively, the new RPM value may be set for a desired volume using Equation 2 without subsequently repeating the volume measurement procedure.

As discussed above, one application of dispensing methods and apparatus of the present invention is in the dispensing of underfill material for flip chip integrated circuits. Typically, in this application, a fillet of underfill material is dispensed around the perimeter of a flip chip, and the dispensed material wicks under the flip chip or the dispensed material is forced under the flip chip using air pressure or some other technique. In a typical application, to dispense the fillet of material around the perimeter of the flip chip, either the flip chip is moved while dispensing occurs, or more typically, the dispensing head is moved around the perimeter of the flip chip, while the flip chip remains stationary.

In one embodiment of the present invention, to ensure proper distribution of the underfill material around and beneath the flip chip, the speed of the dispensing head is determined based in part on the total perimeter of the flip chip, the volume of material to be dispensed, and the set dispensing time. In addition, the speed is determined based on a dispensing delay value, which is a time delay equal to a period of time from when the pump and dispenser assembly is controlled to start dispensing to the time at which dispensing actually occurs. This delay is due to several factors including mechanical delay in the pump and due to any upward creepage of dispensing material in the pump. Because of the delay, the actual time that material is dispensed from the pump is equal to the set dispensing time minus the delay. In this embodiment of the invention, after the pump has been controlled to dispense material, the dispensing head remains stationary for a period of time equal to the delay value. The speed of the dispensing head around the perimeter of the flip chip after the delay period is then determined by dividing the total travel distance around the perimeter by the actual dispensing time.

Figure 12:
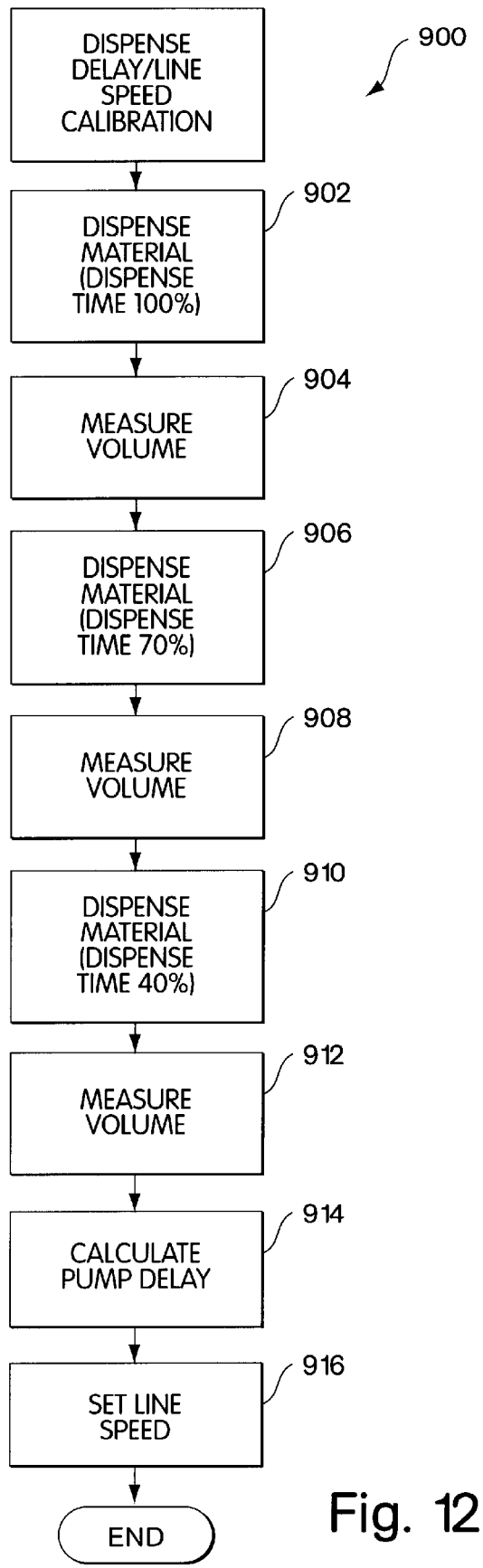
FIG. 12 is a flow chart of a delay/line speed calibration procedure used in the dispensing system of FIG. 6.

In embodiments of the present invention that use a rotary type pump, the delay value is determined using a delay calibration/line speed procedure 900 that will now be described with reference to FIG. 12. The delay calibration line speed procedure 900 is performed after the volume calibration described above. In steps 902 through 912 of the procedure 900, three different size drops of material are dispensed from the dispensing system, and the volume measurement procedure (step 700 of procedure 600) is used to measure the volume of each of the drops. The RPM setting of the rotary pump is kept constant for the dispensing of the three drops. The size of the drops is varied by varying the dispensing time. For the first drop, the dispensing time is set equal to the dispensing time used during volume calibration or to a time corresponding to a maximum amount of material that can fit in the measurement area of the vision system. For the second drop, the dispensing time is set equal to 70% of the dispensing time used for the first drop, and for the third drop, the dispensing time is set equal to 40% of the dispensing time used for the first drop. As understood by those skilled in the art, other dispense times could be used.

After the three drops have been dispensed, and the volume of the drops has been determined, then in step 914, the delay value is calculated by the computer control system. In one embodiment, the delay value is calculated by graphing time verses volume dispensed for each of the three drops (three data points), drawing a straight line through the three data points, and finding the time axis intercept point of the straight line. The time axis intercept point is equal to the delay value.

In step 916 of the procedure 900, the speed of the dispensing head is then set by dividing the total travel distance of the dispense head around the perimeter of the flip chip by the difference of the dispense time and the delay value.

Once the speed has been set, calibration is complete, and the dispensing system may be used to dispense material onto substrates.

In embodiments of the invention described above, the viewing system 130 has been described as being mounted on a common arm with the pump and dispenser apparatus 110. In alternate embodiments, the viewing system 130 may be mounted on an arm separate from the pump and dispenser apparatus. Further, a second viewing system, dedicated to the volumetric measuring apparatus, may be included in the dispensing system. The lens used on the camera of the viewing system 130 is selected based on the volume of material to be measured. In one embodiment of the invention, a 35 mm lens is used for measuring volumes up to approximately 50 µl, however, other lenses such as a 25 mm lens or a 50 mm lens may also be used in embodiments of the present invention. Illumination for the vision system of the dispensing system 400 is provided by a white light illuminator included within the vision system, however, other lighting schemes could also be used.

Embodiments of the invention have been described with respect to a dispensing system that dispenses drops of material onto a circuit board or some other substrate. Embodiments of the volumetric measuring system of the present invention are also suitable for use with other systems to determine the volume and/or weight of materials dispensed as lines or in other geometric configurations.

In embodiments of the invention discussed above, the computer control system may be implemented using an appropriately programmed personal computer having a Pentium processor.

In an alternate embodiment of the present invention, the computer control system calculates the weight of the target drop based on the calculated volume and based on the specific gravity of the material being dispensed.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only. It is not intended as limiting. The invention's limit is defined only in the following claims and the equivalence thereto.

What is claimed is:

1. A method of calibrating a dispensing system comprising:
   dispensing a quantity of material onto a first substrate using a dispensing pump;
   placing a second substrate on the material on the first substrate;
   compressing the material between the first substrate and the second substrate;
   determining the quantity of material dispensed based on a surface area of the compressed material on the second substrate;
   comparing the quantity of material dispensed with a desired quantity of material to obtain a difference; and
   adjusting at least one characteristic of the dispensing pump based on the difference.

2. The method of claim 1, wherein the step of determining the quantity includes determining the volume of the quantity of material.

3. The method of claim 2, wherein the step of adjusting at least one characteristic includes adjusting a lateral velocity of the dispensing pump.

4. The method of claim 3, further comprising:
   loading a third substrate into the dispensing system, the third substrate having a component mounted thereon; and
   dispensing material around the component using the dispensing pump.

5. The method of claim 4, wherein the step of compressing includes compressing the material between the first substrate and the second substrate until the first substrate is at a predetermined distance from the second substrate.

6. The method of claim 1, wherein the step of adjusting at least one characteristic includes adjusting a lateral velocity of the dispensing pump.

7. The method of claim 1, further comprising:
   loading a third substrate into the dispensing system, the third substrate having a component mounted thereon; and
   dispensing material around the component using the dispensing pump.

8. The method of claim 1, further comprising heating the first substrate prior to dispensing material onto the first substrate.

9. The method of claim 1, wherein the step of compressing includes compressing the material between the first substrate and the second substrate until the first substrate is at a predetermined distance from the second substrate.

10. A dispensing system comprising:
    a dispensing pump that dispenses a quantity of material;
    a controller coupled to the dispensing pump to control dispensing of material from the controller;
    a calibration fixture dispensed beneath the dispensing pump for receiving a quantity of material from the dispensing pump during a calibration routine of the dispensing system, the calibration fixture including means for compressing material dispensed by the dispenser to a predetermined width;
    means for determining the volume of material compressed in the calibration fixture; and means for adjusting characteristics of the dispensing pump based on the volume of material.

11. The dispensing pump of claim 10, wherein the dispensing system further includes a movable arm coupled to the dispensing pump for moving the dispensing pump over a substrate during dispensing.

12. The dispensing pump of claim 11, wherein the means for adjusting includes means for varying a velocity that the dispensing pump is moved during dispensing on a substrate based on the volume of the material.

13. The dispensing pump of claim 10, wherein the means for adjusting includes means for varying a velocity that the dispensing pump is moved during dispensing on a substrate based on the volume of the material.

* * * * *